US012759077B2

(12) United States Patent
Takatsu et al.

(10) Patent No.: US 12,759,077 B2
(45) Date of Patent: Oct. 13, 2026

(54) LASER PROCESSING HEAD AND LASER PROCESSING DEVICE

(71) Applicant: AMADA CO., LTD., Kanagawa (JP)

(72) Inventors: Masato Takatsu, Kanagawa (JP); Jun Setoguchi, Kanagawa (JP)

(73) Assignee: Amada Co., Ltd., Kanagawa (JP)

( * ) Notice: Subject to any disclaimer, the term of this patent is extended or adjusted under 35 U.S.C. 154(b) by 540 days.

(21) Appl. No.: 18/286,317

(22) PCT Filed: Mar. 25, 2022

(86) PCT No.: PCT/JP2022/014206
§ 371 (c)(1),
(2) Date: Oct. 10, 2023

(87) PCT Pub. No.: WO2022/220054
PCT Pub. Date: Oct. 20, 2022

(65) Prior Publication Data

US 2024/0189943 A1 Jun. 13, 2024

(30) Foreign Application Priority Data

Apr. 16, 2021 (JP) ................................ 2021-069778

(51) Int. Cl.
*B23K 26/21* (2014.01)

(52) U.S. Cl.
CPC .................................. *B23K 26/21* (2015.10)

(58) Field of Classification Search
CPC .... B23K 26/146; B23K 26/703; B23K 3/085; B23K 26/21
USPC .................................................... 219/121.63
See application file for complete search history.

(56) References Cited

U.S. PATENT DOCUMENTS 3,637,296 A * 1/1972 McLafferty .......... G02B 7/1815 359/845
3,645,608 A * 2/1972 Staley .................. G02B 7/1815 359/845
4,031,351 A * 6/1977 Martin ................ B23K 26/123 219/121.84

(Continued)

FOREIGN PATENT DOCUMENTS

JP 2020-116603 8/2020
WO 2020/153157 A1 7/2020

OTHER PUBLICATIONS

Extended European Search Report for corresponding EP Application No. 22787979.8 dated Nov. 11, 2024.

(Continued)

*Primary Examiner* — Jimmy Chou
(74) *Attorney, Agent, or Firm* — Renner, Otto, Boisselle & Sklar, LLP

(57) ABSTRACT

A conversion element converts a beam profile of a laser beam that is supplied from outside and emitted from a nozzle. A holder holds the conversion element. The holder is connected to a tip end of a shaft. An actuator moves the shaft such that the conversion element enters a luminous flux of the laser beam and retracts therefrom. A first flow path that enables a fluid that is a refrigerant to flow from a base side of the shaft toward a holder side of the shaft is formed inside the shaft, and a second flow path that enables the fluid flowing through the first flow path to return from the holder side of the shaft to the base side is formed inside the shaft.

6 Claims, 13 Drawing Sheets

(56) References Cited

U.S. PATENT DOCUMENTS 4,202,605 A * 5/1980 Heinz .................... G02B 26/06 359/845
4,253,739 A * 3/1981 Carlson ................ G02B 7/1815 359/845
4,652,722 A * 3/1987 Stone .................... H01S 3/2383 219/121.76
4,698,480 A * 10/1987 Klingel .............. B23Q 3/15573 219/121.84
4,730,885 A * 3/1988 Doi ...................... B23K 26/703 385/75
4,772,110 A * 9/1988 Roszhart .............. G02B 7/1815 359/845
5,094,519 A * 3/1992 Ealey ................... G02B 7/1815 359/845
5,208,439 A * 5/1993 Arai ....................... G02B 26/08 359/845
5,237,148 A * 8/1993 Aoki ...................... B41J 2/1634 219/121.7
5,237,150 A * 8/1993 Karube .............. B23K 26/0643 219/121.72
5,303,081 A * 4/1994 Totsuka ............... B23K 26/703 219/121.33
5,841,097 A * 11/1998 Esaka .................. B23K 26/067 219/121.64
5,925,271 A * 7/1999 Pollack .................... C21D 1/09 219/121.85
7,193,772 B2 * 3/2007 Betin .................... G02F 1/3538 359/347
7,292,307 B2 * 11/2007 Kino .................. G03F 7/70891 359/845
7,349,063 B2 * 3/2008 Miyajima ............ G02B 7/1815 359/845
11,471,979 B2 * 10/2022 Scheidiger ........... B23K 26/046
2005/0258169 A1 * 11/2005 Hosoe .................... H05B 6/108 219/628
2008/0218735 A1 * 9/2008 Atsumi ................ B23K 26/046 359/804
2008/0251506 A1 * 10/2008 Atsumi .................. B23K 26/03 219/121.72
2011/0056921 A1 * 3/2011 Belletti .............. B23K 26/1476 219/121.67
2012/0074110 A1 * 3/2012 Zediker ................. B08B 7/0042 219/121.72
2015/0048071 A1 * 2/2015 Shioji ................ B23K 26/1476 219/121.84
2017/0136581 A1 * 5/2017 Izumi ................... B23K 26/703
2019/0025542 A1 * 1/2019 Zirilli ..................... G03B 21/16
2019/0242566 A1 * 8/2019 Zirilli ................... H04N 9/3161
2022/0072654 A1 * 3/2022 Takatsu ................ B23K 26/046
2023/0080501 A1 * 3/2023 Kageyama ......... B23K 26/0608 219/121.84

OTHER PUBLICATIONS

International Search Report for corresponding Application No. PCT/JP2022/014206, mailed Jun. 14, 2022.
Written Opinion for corresponding Application No. PCT/JP2022/014206, mailed Jun. 14, 2022.

* cited by examiner (a)

(b)

LASER PROCESSING HEAD AND LASER PROCESSING DEVICE

TECHNICAL FIELD

The present disclosure relates to a laser processing head and a laser processing device.

BACKGROUND ART

Patent Literature 1 (PTL 1) discloses a laser processing head having an optical element that converts the beam profile of a laser beam into a predetermined beam profile, and a drive unit that holds and makes the optical element enter and leave the luminous flux of the laser beam. The laser processing head disclosed in PTL 1 inserts the optical element that converts the beam profile into the luminous flux of the laser beam, thereby converting the beam profile of the emitted laser beam into a beam profile corresponding to the optical element inserted in the luminous flux.

CITATION LIST

Patent Literature

PTL 1: Japanese Unexamined Patent Application Publication No. 2020-116603

SUMMARY OF INVENTION

A thermal lens effect is a phenomenon in which the density or refractive index of a laser beam changes due to an increase in the temperature of a material when the laser beam is absorbed by the material and the energy thereof is converted into heat. Since the entirety of a laser beam does not pass through an optical element inserted into the luminous flux of the laser beam, thermal energy converted by absorbing part of the laser beam increases the temperature of the optical element. The heat is transferred from the heated optical element to a holding member of the drive unit that holds the optical element, and the holding member increases in temperature and thermally expands.

When an optical element excessively increases in temperature, the focal position of a laser beam fluctuates to a degree that cannot be ignored due to the thermal lens effect. In addition, due to excessive thermal expansion of the holding member, a non-negligible defect such as a large shift in the optical axis center of the optical element may occur. These phenomena lead to a defect such as a decrease in processing accuracy and processing stability in laser processing.

Therefore, it is desirable to provide a laser processing head and a laser processing device capable of converting the beam profile of a laser beam while hardly causing any processing defects due to the thermal lens effect or heat conduction.

A first aspect of one or more embodiments provides a laser processing head including: a conversion element configured to convert a beam profile of a laser beam that is supplied from outside and emitted from a nozzle; a holder that holds the conversion element; a shaft in which the holder is connected to a tip end of the shaft; an actuator configured to move the shaft such that the conversion element enters a luminous flux of the laser beam and retracts therefrom; a first flow path that is formed inside the shaft and enables a fluid that is a refrigerant to flow from a base side of the shaft toward a holder side of the shaft; and a second flow path that is formed inside the shaft and enables the fluid flowing through the first flow path to return from the holder side of the shaft to the base side.

According to the first aspect, since the laser processing head includes the first flow path that is formed inside the shaft connected to the holder that holds the conversion element, and causes the refrigerant to flow toward the holder, and the second flow path that returns the refrigerant from the holder side, the shaft, the holder, and the conversion element can be cooled satisfactorily by causing the refrigerant to flow into the first flow path and the second flow path.

A second aspect of one or more embodiments provides a laser processing device including: a laser oscillator configured to output a laser beam; a laser processing head having a conversion element configured to convert a beam profile of the laser beam supplied from the laser oscillator; and a refrigerant supply device configured to supply a refrigerant to the laser processing head, in which the laser processing head includes: a holder that holds the conversion element; a shaft in which the holder is connected to a tip end of the shaft; an actuator configured to move the shaft such that the conversion element enters a luminous flux of the laser beam and retracts therefrom; a first flow path that is formed inside the shaft and enables the refrigerant that is supplied from the refrigerant supply device to flow from a base side of the shaft toward a holder side of the shaft; and a second flow path that is formed inside the shaft and enables the refrigerant flowing through the first flow path to return from the holder side of the shaft to the base side.

According to the second aspect, since the laser processing device includes the first flow path that is formed inside the shaft connected to the holder that holds the conversion element, and causes the refrigerant to flow toward the holder, the second flow path that returns the refrigerant from the holder side, and the refrigerant supply device that supplies the refrigerant to the first flow path, the shaft, the holder, and the conversion element can be cooled satisfactorily by causing the refrigerant to flow into the first flow path and the second flow path.

In accordance with a laser processing head and a laser processing device according to one or more embodiments, it is possible to convert the beam profile of a laser beam while hardly causing any processing defects due to the thermal lens effect or heat conduction.

DESCRIPTION OF EMBODIMENTS

Example

Figure 1:
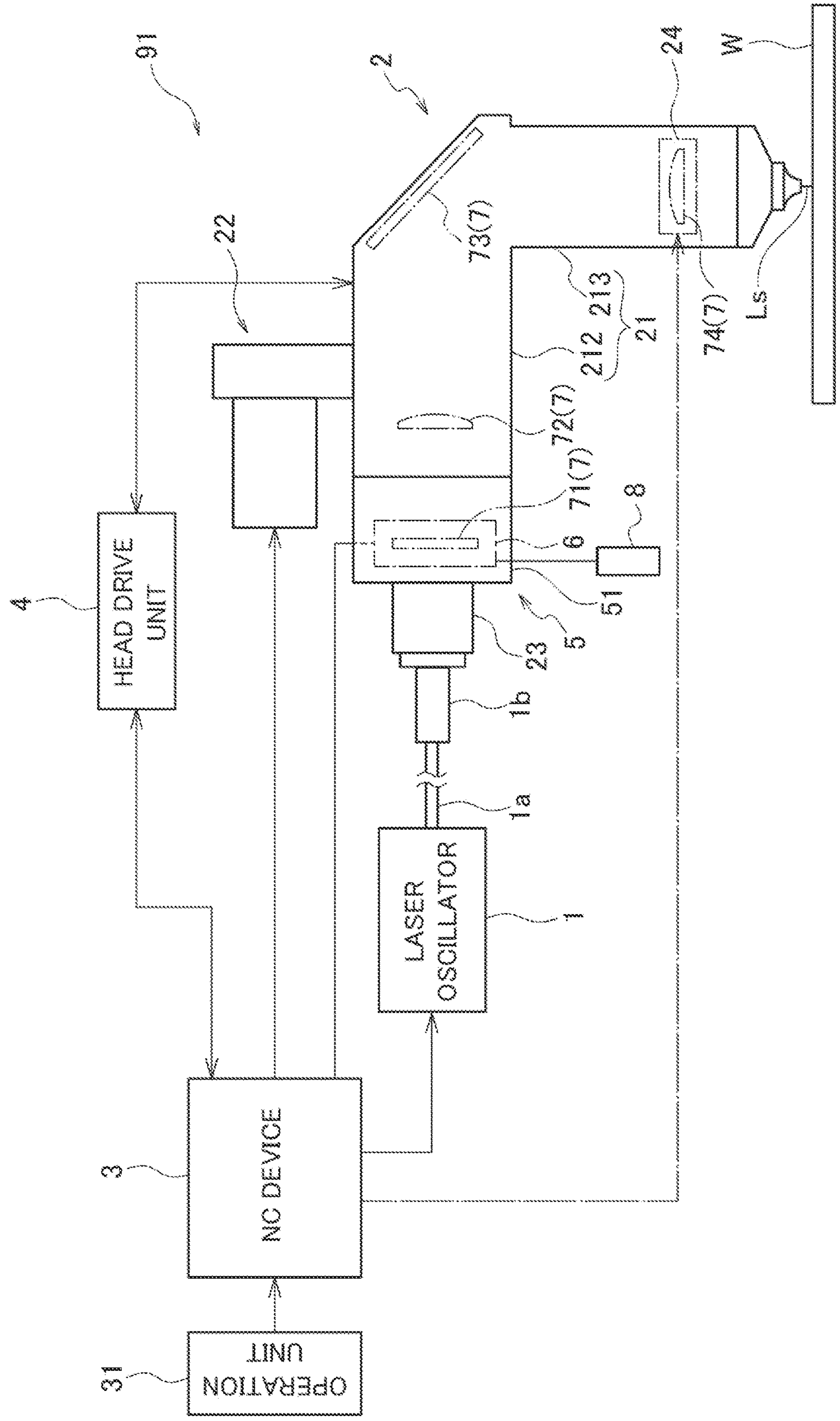
FIG. 1 is a diagram illustrating an overall configuration of a laser processing device 91 which is an example of a laser processing device according to one or more embodiments.

A laser processing head and a laser processing device according to one or more embodiments will be described based on a laser processing head 2 and a laser processing device 91 including the laser processing head 2 of an example. FIG. 1 is a block diagram illustrating a configuration of the laser processing device 91 which is an example of the laser processing device according to one or more embodiments. The laser processing device 91 includes a laser oscillator 1, a laser processing head 2, an NC (numerical control) device 3, a head drive unit 4, an operation unit 31, and a refrigerant supply device 8. The NC device 3 is an example of a control unit.

The laser oscillator 1 generates a laser beam Ls with a predetermined wavelength band, for example using a fiber laser. The generated laser beam Ls is supplied to the laser processing head 2 via a fiber cable 1*a* and a coupler 1*b*. The laser oscillator 1 is not limited to a fiber laser oscillator, and may be a solid-state laser oscillator, a direct-diode laser oscillator, or the like.

Figure 2:
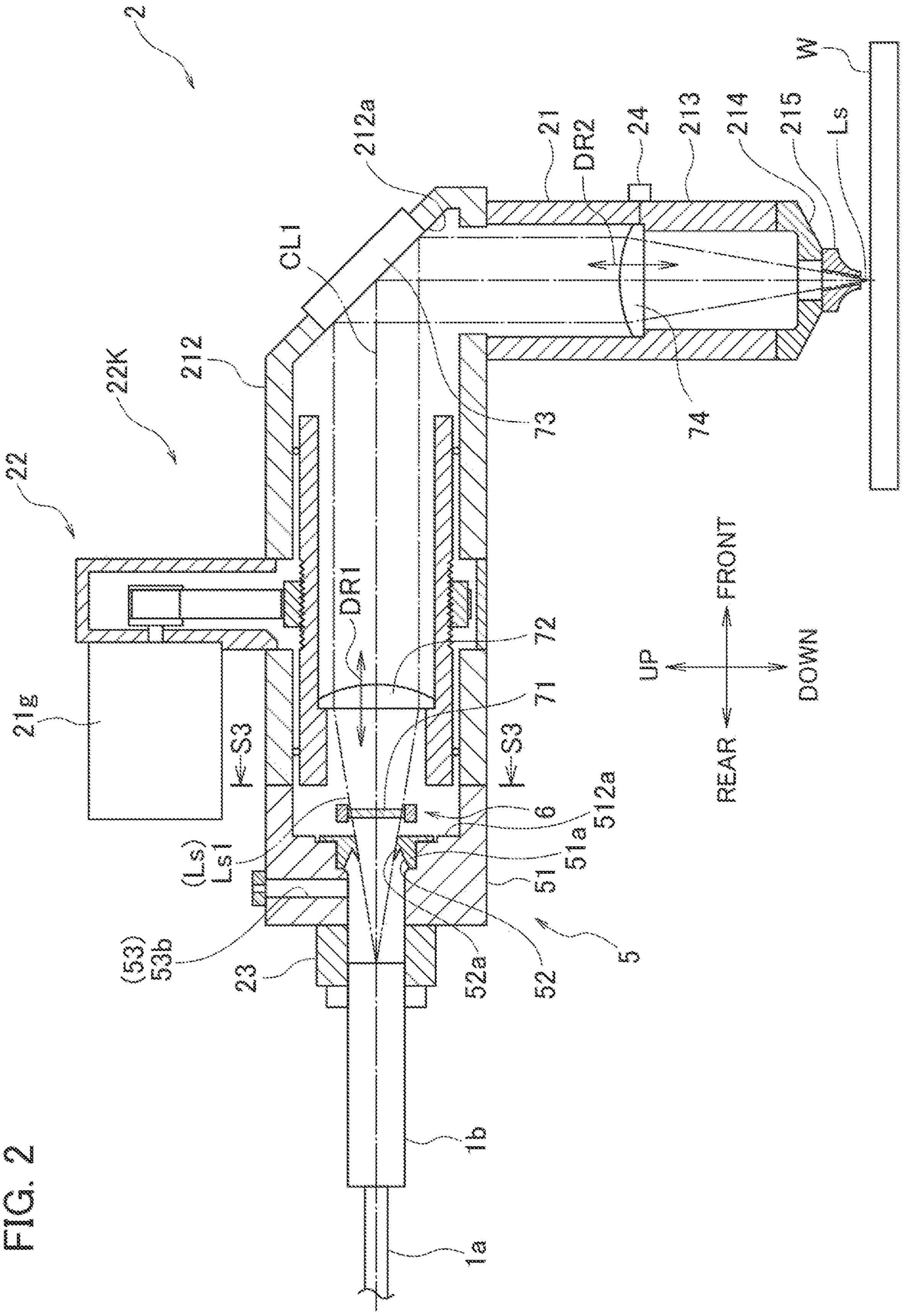
FIG. 2 is a longitudinal cross-sectional view of a laser processing head 2 provided in the laser processing device 91.

FIG. 2 is a longitudinal cross-sectional view of the laser processing head 2 provided in the laser processing device 91. Each direction in the up-down directions and front-rear directions is defined by arrows in FIG. 2. The left side is the front side in the page space and the right side is the rear side in the page space.

As illustrated in FIGS. 1 and 2, the laser processing head 2 includes a coupler connection unit 23, a profile conversion device 5, a housing 21, a collimating lens drive unit 22, a focusing lens drive unit 24, and an optical element group 7. The optical element group 7 includes a beam profile conversion element 71, a collimating lens 72, a bend mirror 73, and a focusing lens 74. Hereinafter, the beam profile conversion element 71 is referred to as a conversion element 71.

As illustrated in FIG. 2, in the coupler connection unit 23, a coupler 1*b* is connected to one end side thereof and the other end side thereof is connected to the profile conversion device 5. The profile conversion device 5 includes a conversion element movement unit 6. The conversion element movement unit 6 includes a base unit 51, an aperture 52, and a conversion element 71. The conversion element 71 enters and retracts from the luminous flux of a laser beam Ls according to the operation of the conversion element movement unit 6. The details of the profile conversion device 5 will be described later.

The housing 21 includes a tubular first housing 212 and a tubular second housing 213, and the housing 21 is formed in an L-shape. The first housing 212 includes one end connected to the base unit 51 of the profile conversion device 5. The first housing 212 includes the collimating lens 72, and the collimating lens drive unit 22 that moves the collimating lens 72. A 45-degree inclined surface 212*a* is formed inside the other end side of the first housing 212, and a bend mirror 73 is attached to the inclined surface 212*a*. The second housing 213 is connected such that one end side is perpendicular to the other end portion of the first housing 212. A nozzle holder 214 is attached to a tip end which is the other end of the second housing 213, and a nozzle 215 is detachably attached to the nozzle holder 214.

On the inner side of the laser processing head 2, the aperture 52, the conversion element 71, the collimating lens 72, the bend mirror 73, and the focusing lens 74 are arranged in this order from the coupler 1*b* side.

The laser beam Ls supplied from the laser oscillator 1 is emitted as divergent light from the coupler 1*b* into the base unit 51 of the profile conversion device 5. The laser beam Ls that is emitted as divergent light passes through an opening 52*a* of the aperture 52 and is made to be parallel light or light having a divergence angle or a convergence angle depending on the adjustment position of the collimating lens 72. The angle-adjusted laser beam Ls is reflected by the bend mirror 73, enters the second housing 213, and is emitted from the nozzle 215 toward a workpiece W which is a work material so as to be focused at a predetermined focal point by the focusing lens 74.

The conversion element 71 is inserted between the aperture 52 and the collimating lens 72 when converting a beam profile with respect to a luminous flux Ls1 of the laser beam Ls.

The collimating lens drive unit 22 includes a drive unit 22K including a motor 21*g*. The drive unit 22K converts the rotational movement of the motor 21*g* into a linear movement and moves the collimating lens 72 in the direction of an optical axis CL1 of the luminous flux Ls1 (see arrow DR1).

The focusing lens 74 moves linearly in the direction of the optical axis CL1 according to the operation of the focusing lens drive unit 24 (see arrow DR2). The focal position of the laser beam Ls emitted from the nozzle 215 to the outside is adjusted by the movement of the focusing lens 74 in the direction of the optical axis CL1.

The conversion element movement unit 6 moves the conversion element 71, which is an optical element for converting the beam profile of the laser beam Ls supplied from the laser oscillator 1, back and forth between the entering position where the optical element has entered the luminous flux Ls1 of the laser beam Ls and the retracted position where the optical element has retracted from the luminous flux Ls1 of the laser beam Ls.

Figure 3:
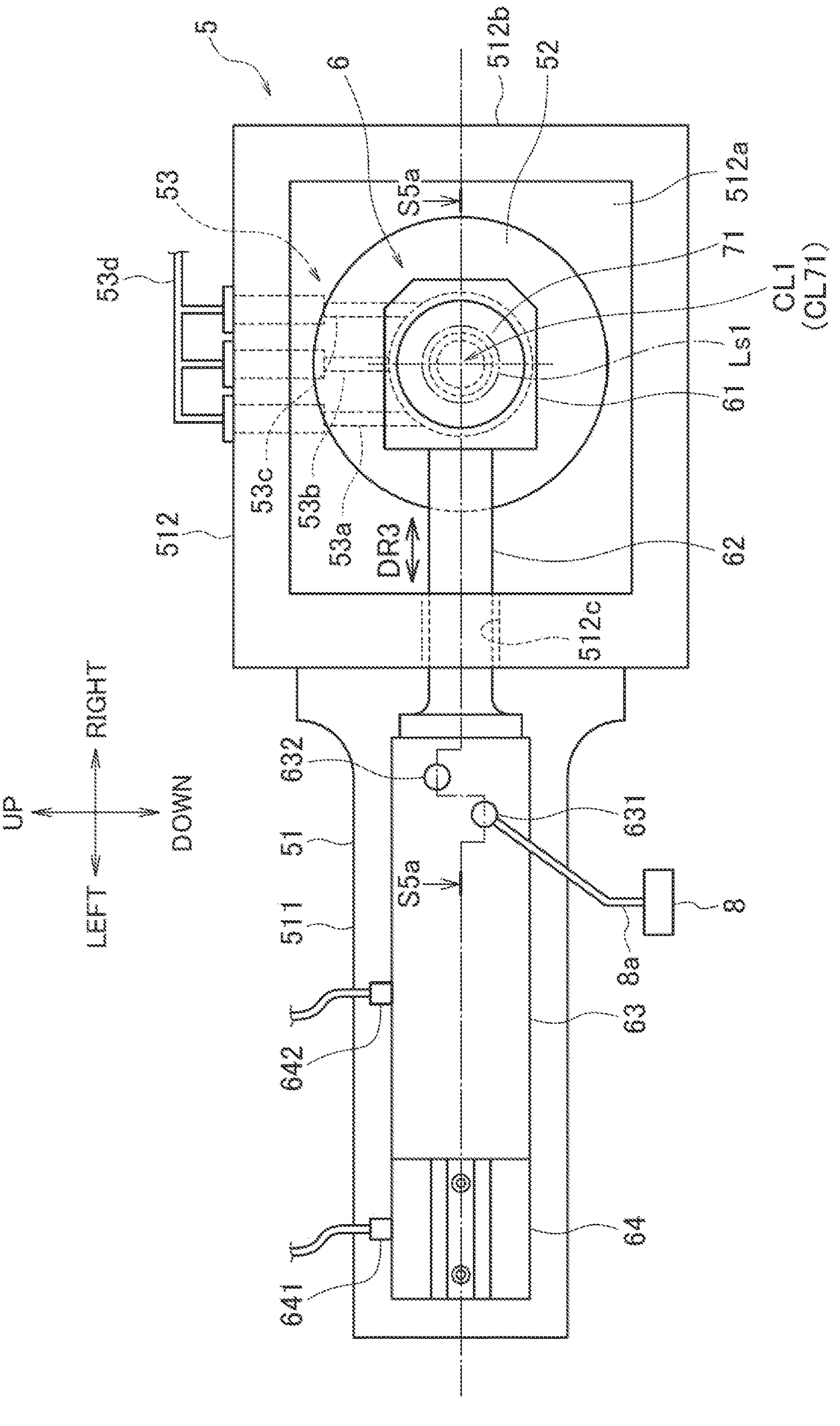
FIG. 3 is a plan view of the position S3-S3 in FIG. 2 viewed from a front side, and is a diagram illustrating a first aspect of a profile conversion device 5 provided in the laser processing head 2.
Figure 4:
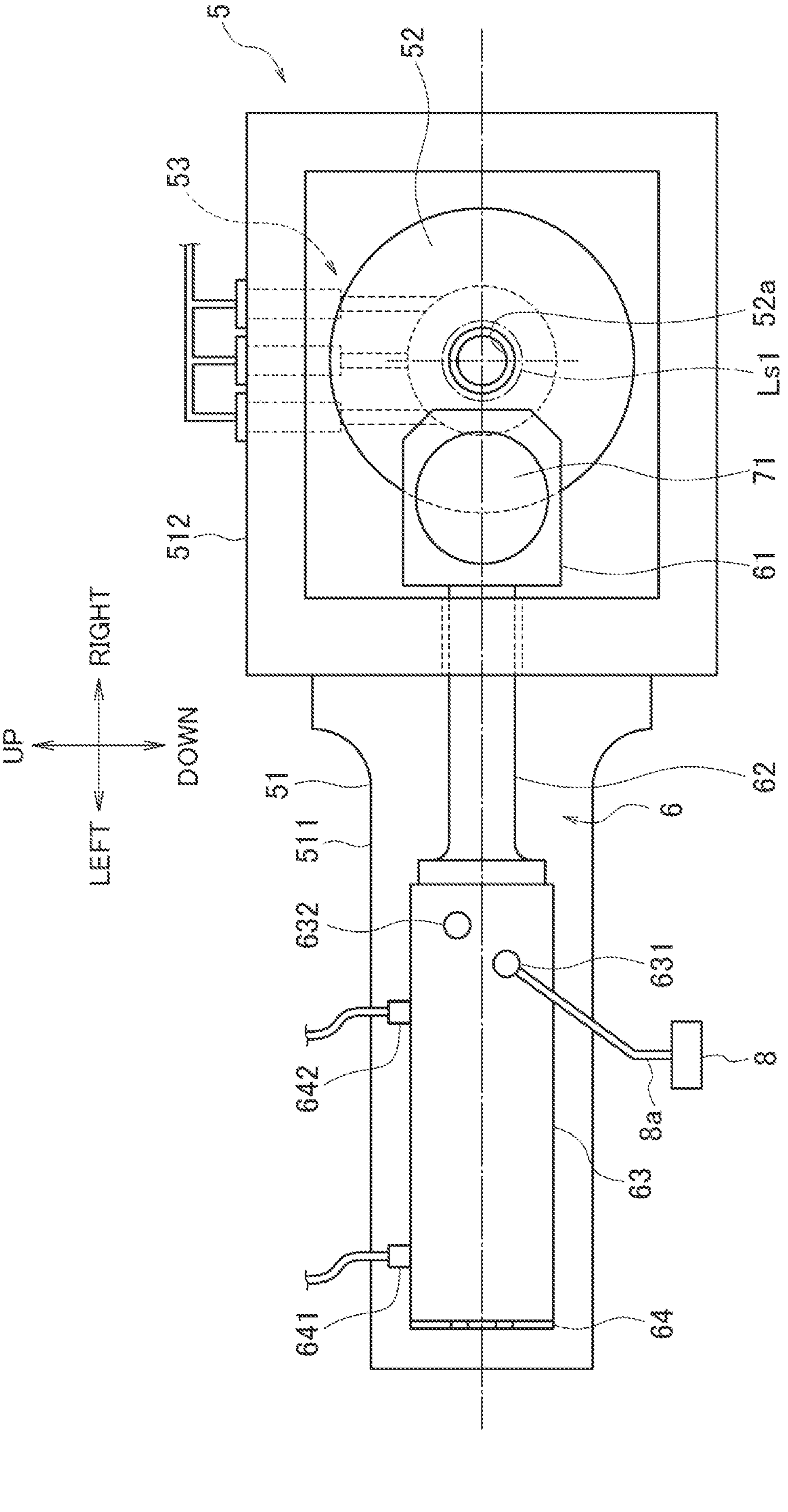
FIG. 4 is a plan view illustrating a second aspect of the profile conversion device 5.
Figure 5:
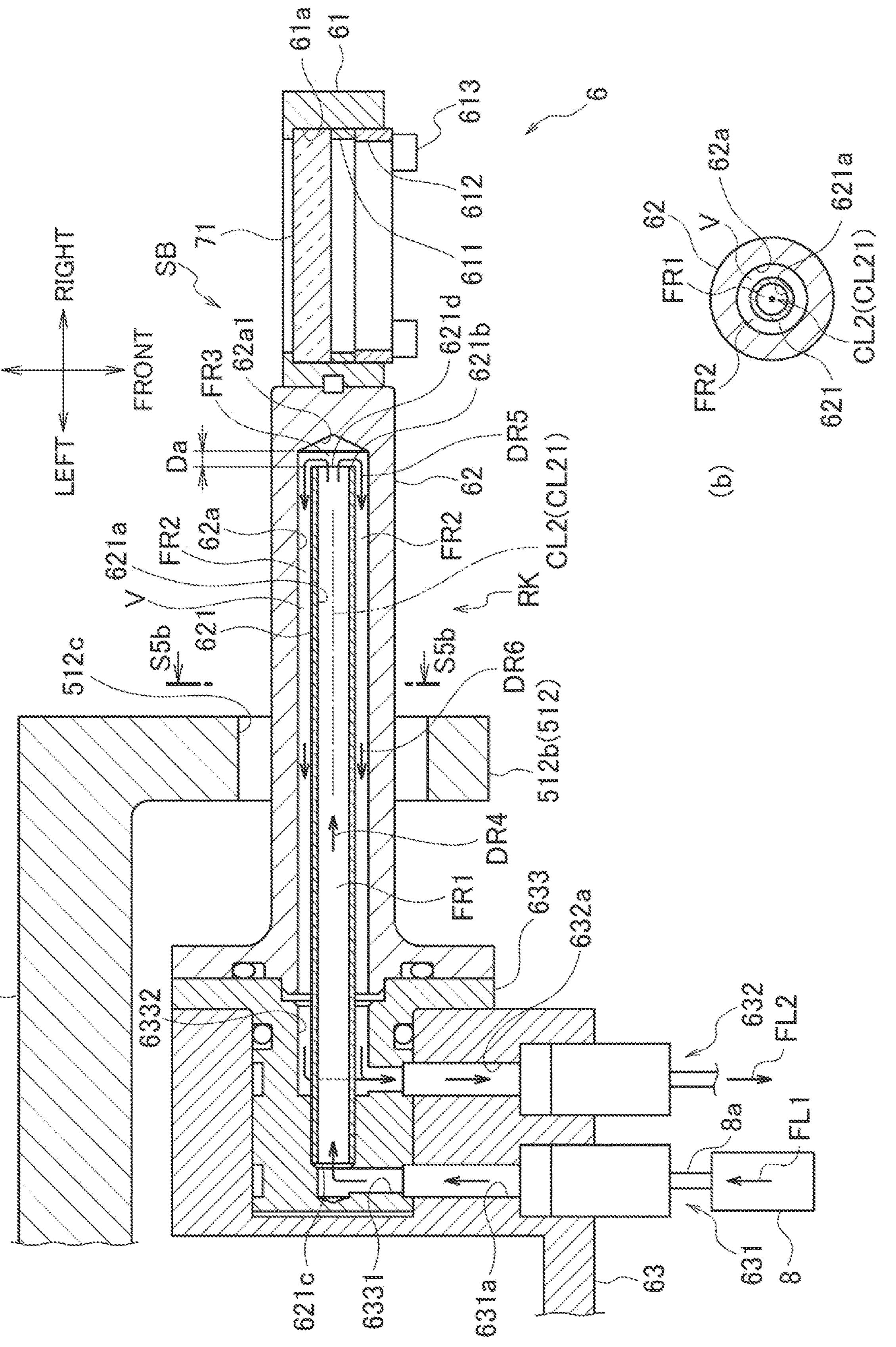
FIG. 5 is a diagram illustrating a cooling unit RK provided in the laser processing head 2, FIG. 5(*a*) is a cross-sectional view at the position S5*a*-S5*a* in FIG. 3, and FIG. 5(*b*) is a cross-sectional view at the position S5*b*-S5*b* in FIG. 5(*a*).
Figure 6:
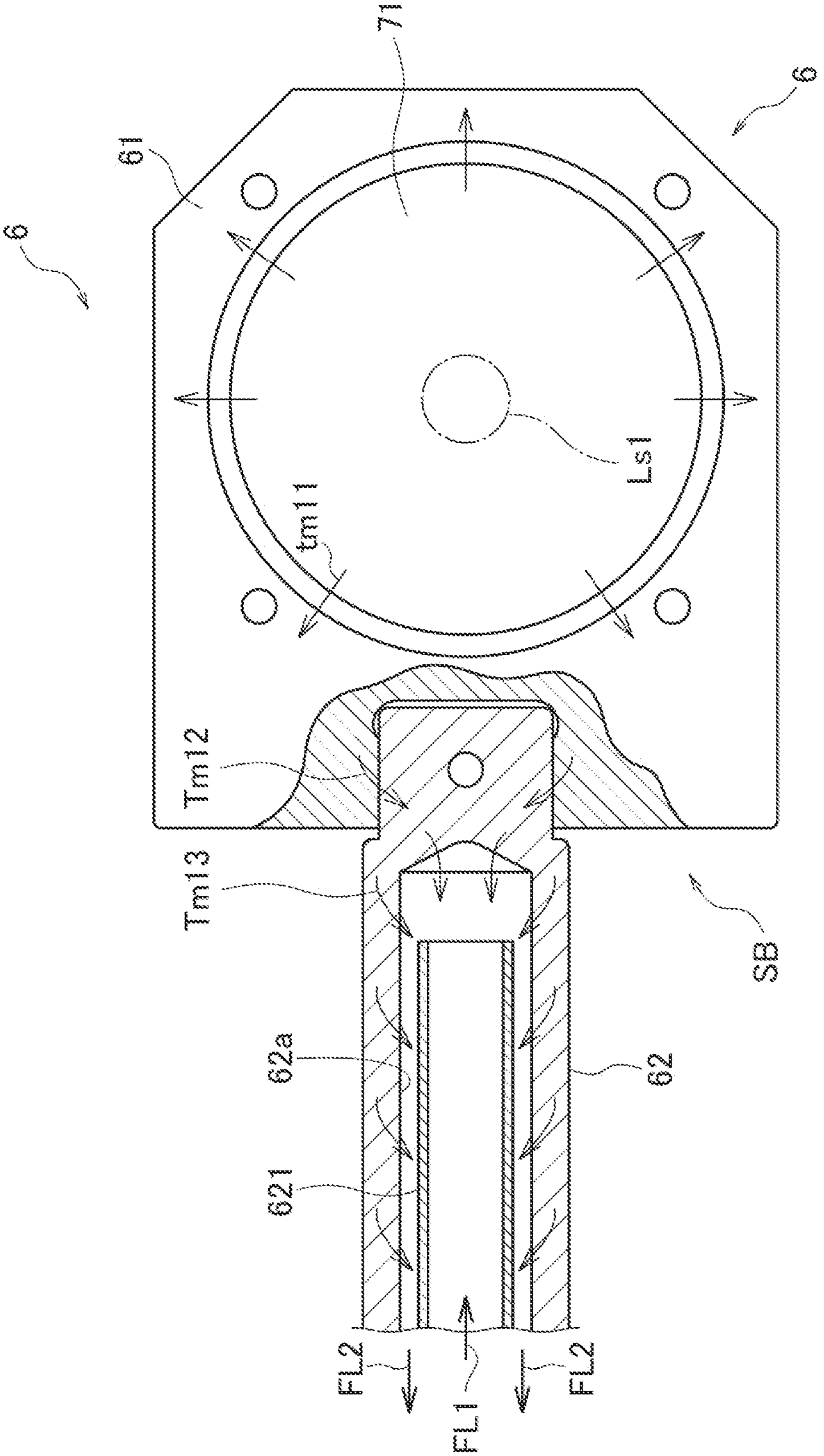
FIG. 6 is a first cross-sectional view illustrating a heat transfer mode of a conversion element movement unit 6 provided in the profile conversion device 5.
Figure 7:
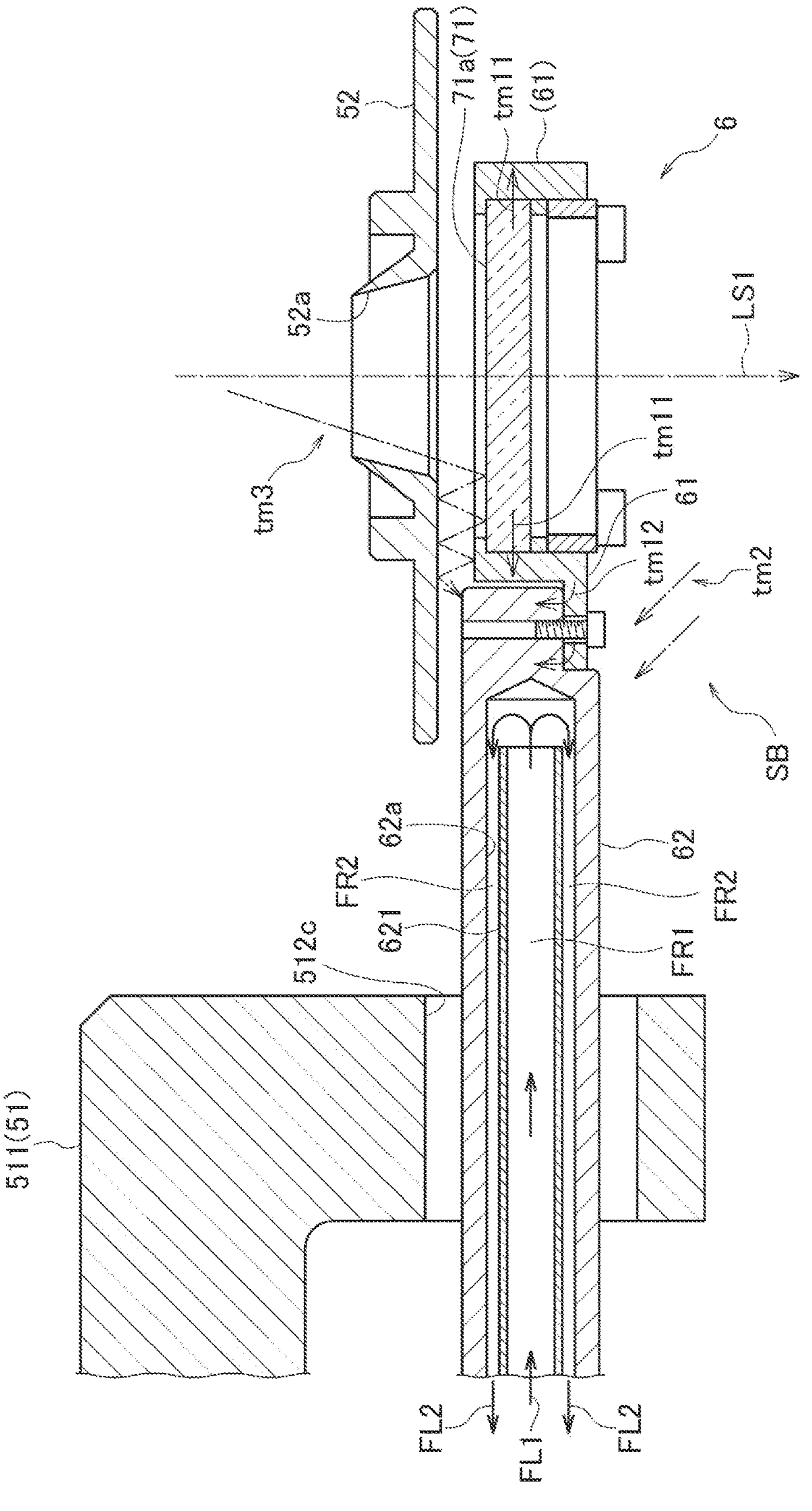
FIG. 7 is a second cross-sectional view illustrating a heat transfer mode of the conversion element movement unit 6.

Next, the profile conversion device 5 including the conversion element movement unit 6 will be described in detail with reference to FIGS. 3 to 7 in addition to FIG. 2. FIG. 3 is a plan view of the position S3-S3 in FIG. 2 viewed from the front side, and is a diagram illustrating a first aspect of the profile conversion device 5 provided in the laser processing head 2. FIG. 4 is a plan view illustrating a second aspect of the profile conversion device 5. FIG. 5 is a diagram illustrating a cooling unit RK provided in the laser processing head 2, and is a cross-sectional view at the position S5-S5 in FIG. 3. FIG. 6 is a first cross-sectional view illustrating a heat transfer mode of the conversion element movement unit 6 provided in the profile conversion device 5. FIG. 7 is a second cross-sectional view illustrating a heat transfer mode of the conversion element movement unit 6.

As illustrated in FIG. 3, the profile conversion device 5 includes the base unit 51 and the conversion element movement unit 6. The base unit 51 includes a thin plate unit 511 that is formed of a metal such as aluminum and is formed in a plate-like shape with an elongated shape to the right and left, and includes a square-like base 512 connected to the tip end portion of the thin plate unit 511 in the longitudinal direction. The metal material of the base unit 51 may be composed of an element having a high thermal conductivity, and when considering this point only, silver, copper, gold, magnesium, zinc or the like may be selected in addition to aluminum. Here, aluminum is selected as the metal material of the base unit 51 because of cost, safety, and efficiency of thermal conductivity. When the base unit 51 has a relatively small volume, copper may be selected.

In FIG. 2, the thin plate unit 511, which is not illustrated in FIG. 2, is arranged so as to extend to the left, which is the front side in the page space, with respect to the optical axis CL1.

The base 512 includes a rectangular bottom portion 512*a*, and a frame wall portion 512*b* which is erected toward the front in a rectangular frame shape from each side of the bottom portion 512*a*. At the bottom portion 512*a*, the base 512 has a generally circular through-hole 51*a* centered at a position that is the optical axis CL1 of the laser beam Ls (see FIG. 2). The aperture 52 is attached so as to cover the through-hole 51*a* from the front side, and has the opening 52*a* which is a circular diaphragm hole of a predetermined area in the center.

An air ejection unit 53 is formed on the coupler 1*b* side from the aperture 52 at the inner surface of the through-hole 51*a* of the base 512. In this example, the air ejection unit 53 includes three vent holes 53*a* to 53*c* arranged side by side in the right and left directions, and an air supply unit 53*d* having three branches at the end to supply air to the respective vent holes 53*a* to 53*c* in parallel. The air is de-dusted dry air that is supplied from a supply source such as an unillustrated compressor. The air ejected from the air vents 53*a* to 53*c* flows in the laser processing head 2 in a state of higher pressure than the outside air, thereby preventing dust from adhering to the optical element group 7 or the like.

The conversion element movement unit 6 includes a conversion element 71, a holder 61, a shaft 62, and an actuator 64 having and a slider 63. The actuator 64 is a linear actuator. The conversion element 71 is a circular thin plate member made of quartz and converts the beam profile of the laser beam Ls. The holder 61 holds the conversion element 71 such that an optical axis CL71 of the conversion element 71 becomes parallel to the optical axis CL1 of the laser beam Ls. The holder 61 is a metal member that is generally rectangular in plan view.

As illustrated in FIG. 5, the holder 61 has a stepped hole 61*a* for housing the conversion element 71. By inserting the conversion element 71 into the stepped hole 61*a* and screw-fixing a holding flange 612 to the holder 61 with a bolt 613 through a spring member 611, the conversion element 71 is housed and held in the holder 61.

As illustrated in FIG. 3, the shaft 62 is formed in a rod shape extending from left to right with a metal such as stainless steel, and the holder 61 is connected to the right end of the shaft 62. A through-hole 512*c* is formed in the left wall of the frame wall portion 512*b* of the base 512, the shaft 62 passes through the through-hole 512*c*, and the holder 61 is positioned in the inner space surrounded by the frame wall portion 512*b*.

The left end portion of the shaft 62 is connected to the slider 63 of the actuator 64. The actuator 64 moves the slider 63 at a predetermined stroke to the left and right according to the supply state of air from a first air supply port 641 and a second air supply port 642 (see arrow DR3). The operation of the actuator 64 is controlled by the NC device 3. The holder 61 connected to the slider 63 also moves left and right with the movement of the slider 63.

FIG. 3 illustrates a state in which the holder 61 is at the entering position where the holder 61 has moved to the rightmost position of the predetermined stroke according to the movement of the slider 63, and FIG. 4 illustrates a state in which the holder 61 is at the retracted position where the holder 61 has moved to the leftmost position of the predetermined stroke according to the movement of the slider 63. That is, the conversion element 71 moves between the entering position at which the conversion element 71 has entered the luminous flux Ls1 of the laser beam Ls and the retracted position at which the conversion element 71 has retracted from the luminous flux Ls1 of the laser beam Ls, according to the operation of the actuator 64.

In appearance, the slider 63 is provided with an inlet 631 for a fluid to flow in and an outlet 632 for a fluid to flow out. A refrigerant supply path 8*a* from the refrigerant supply device 8 is connected to the inlet 631.

As illustrated in FIG. 3, when the holder 61 is at the entering position, the optical axis CL71 of the conversion element 71 coincides with the optical axis CL1 of the laser beam Ls. When the holder 61 is at the entering position, the entire cross-section of the luminous flux Ls1 of the laser beam Ls is included within the effective area of the conversion element 71, and the beam profile of the luminous flux Ls1 is converted into a beam profile corresponding to the conversion characteristics unique to the conversion element 71. As illustrated in FIG. 4, when the holder 61 is at the retracted position, not only the conversion element 71 but also the holder 61 is in a position that is not exposed to the luminous flux Ls1 of the laser beam Ls.

As illustrated in FIG. 5, a joint 633 is attached to the right end portion of the slider 63, and the left end portion of the shaft 62 is connected to the joint 633. The joint 633 includes a connecting passage 6331 and a connecting passage 6332.

The conversion element movement unit 6 includes the cooling unit RK for cooling the holder 61 and the shaft 62. The cooling unit RK includes a blind hole 62*a*, a pipe 621, the connecting passage 6331, the connecting passage 6332, a connecting path 631*a*, a connecting path 632*a*, the inlet 631, and the outlet 632. The refrigerant supply path 8*a* connects between the inlet 631 and the refrigerant supply device 8.

The blind hole 62*a* is a non-penetrating recess that opens at the left end face of the shaft 62 and is formed in a straight line along the axis. The blind hole 62*a* is connected to the L-shaped connecting passage 6332, and the left end of the connecting passage 6332 that serves as an exit and is formed in the joint 633. A bottom portion 62*al* of the blind hole 62*a* is positioned beyond the longitudinal center of the shaft 62 and close to the holder 61. The connecting passage 6332 is connected to the outlet 632.

The pipe 621 is a tubular member. Further, the pipe 621 has a left end supported by the joint 633, and is inserted into the blind hole 62*a* in parallel with the blind hole 62*a*. The pipe 621 is arranged so as not to come into contact with the inner surface of the blind hole 62*a*. For example, an axis line CL21 of the pipe 621 coincides with an axis line CL2 of the blind hole 62*a*. The inner space (first space) of a hole 621*a*, which is a through-hole of the pipe 621, is a first flow path FR1 through which a refrigerant FL1 can flow. A space V, which is the space (second space) between the outer surface of the pipe 621 and the inner surface of the blind hole 62*a*, is a second flow path FR2 through which the refrigerant FL1 can flow.

For example, the outer diameter of the pipe 621 and the inner diameter of the hole 621*a*, and the inner diameter of the blind hole 62*a* may be set such that the cross-sectional area of the first flow path FR1 generally coincides with the cross-sectional area of the second flow path FR2 in the cross-section perpendicular to the axis line CL2. In a tip portion 621*b* of the pipe 621, a connecting flow path FR3 does not reach the bottom portion 62*al* of the blind hole 62*a*, and the connecting flow path FR3 connecting the first flow path FR1 and the second flow path FR2 is formed as a gap between the bottom portion 62*al* and the pipe 621. That is, a second opening 621*d*, which is the right end of the hole 621*a* of the pipe 621, opens inside the blind hole 62*a*.

The distance in the axial line CL2 direction between the tip end portion 621*b* of the pipe 621 and the tip end position of the portion having a uniform inner diameter in the blind hole 62*a* (that is, the tip end position of the portion excluding the tip end portion in which the diameter in the blind hole 62*a* gradually decreases) is set as a gap distance Da. The gap distance Da is set such that the refrigerant FL1 such as a fluid flowing out from the first flow path FR1 flows through the connection flow path FR3 to the second flow path FR2 as smoothly as possible.

A first opening 621*c*, which is the left end of the hole 621*a* of the pipe 621, is connected to the connection passage 6331. The connection passage 6331 is connected to the inlet 631.

The refrigerant FL1 supplied from the refrigerant supply device 8 flows to the cooling unit RK. The refrigerant FL1 absorbs the heat of the conversion element 71, the holder 61, and the shaft 62 which have increased in temperature due to the passage of the laser beam Ls, and discharges the heat to the outside. The group of members including at least the conversion element 71, the holder 61, and the shaft 62 which increase in temperature due to the laser beam Ls are collectively referred to as temperature increase members SB.

The increase in temperature of the temperature increase members SB is suppressed by the cooling effect of the cooling unit RK and the refrigerant supply device 8. The effect of the cooling unit RK and the like will be described below in detail.

The refrigerant supply device 8 supplies the refrigerant FL1 to the outside through the refrigerant supply path 8*a*. For example, the refrigerant FL1 is a fluid, specifically water. Hereinafter, the refrigerant FL1 will be described as water FL1. For example, the water FL1 is at normal temperature. The normal temperature is a temperature of 20° C. to 35° C.°. That is, as illustrated in FIG. 5(*a*), the refrigerant supply device 8 continuously supplies the water FL1 to the inlet 631 via the refrigerant supply path 8*a*. The operation for supplying the water FL1 in the refrigerant supply device 8 is controlled by the NC device 3.

The water FL1 supplied to the inlet 631 flows into the hole 621*a* from the first opening 621*c* of the pipe 621 via the connecting passage 6331. The water FL1 flows through the first flow path FR1 toward the second opening 621*d* at the tip end (see arrow DR4). After the water FL1 flows out of the second opening 621*d* and flows into the connecting flow path FR3 in the blind hole 62*a*, the water FL1 flows in the reverse direction (see arrow DR5) and flows through the annular second flow path FR2 between the outer surface of the pipe 621 and the inner surface of the blind hole 62*a* (see arrow DR6). The water FL1 is then discharged to the outside through the connecting flow path 6332 from the outlet 632 as discharge water FL2 which is a discharge refrigerant.

As illustrated in FIG. 6, when the conversion element 71 is at the entering position, the luminous flux Ls1 of the laser beam Ls passes through the conversion element 71. At this time, the conversion element 71 absorbs part of the laser beam Ls as thermal energy and increases in temperature. As the conversion element 71 increases in temperature, the heat moves radially to the holder 61 for holding the conversion element 71 due to heat conduction (see arrow tm11), and thus the holder 61 also increases in temperature. The heat which has moved to the holder 61 moves to the shaft 62 connected to the holder 61 due to heat transfer (see arrow tm12).

The blind hole 62*a* is formed inside the shaft 62, and the water FL1 flows inside the blind hole 62*a*. For this reason, the heat of the shaft 62 moves from the inner surface of the blind hole 62*a* to the water FL1 due to heat transfer (see arrow tm 13). As a result, the water FL1 increases in temperature, thereby suppressing the increase in temperature of the shaft 62.

The increase in temperature of the holder 61 and the shaft 62 occurs not only when the laser beam Ls passes through the conversion element 71, but also in the following events. For example, the temperature may increase when stray light tm2 (see FIG. 7) due to diffused reflection on the inner surface downstream of the conversion element 71 in the laser processing head 2 strikes the holder 61 and the shaft 62. In addition, the temperature may increase when stray light tm3 (see FIG. 7) which is repeatedly reflected between an incident surface 71*a* of the conversion element 71 and the aperture 52 facing the incident surface 71*a* strikes the holder 61 and the shaft 62.

The heat of the holder 61 and the shaft 62 that have increased in temperature due to the stray light tm2 and the stray light tm3 is transferred to the water FL1 flowing in the second flow path FR2. For this reason, the water FL1 increases in temperature, thereby suppressing the increase in temperature of the holder 61 and the shaft 62. However, the amount of heat supplied to the temperature increase members SB in these events is relatively small, and the temperature increase members SB increase in temperature mainly because the laser beam Ls passes through the conversion element 71. Accordingly, in the normal irradiation state of the laser beam Ls with respect to a workpiece W, the increase in temperature of the temperature increase members SB is mainly caused by the conversion element 71, followed by the holder 61 and the shaft 62.

This satisfactorily suppresses the increase in temperature of the temperature increase members SB, in the laser processing head 2 having the cooling unit RK.

Figure 8:
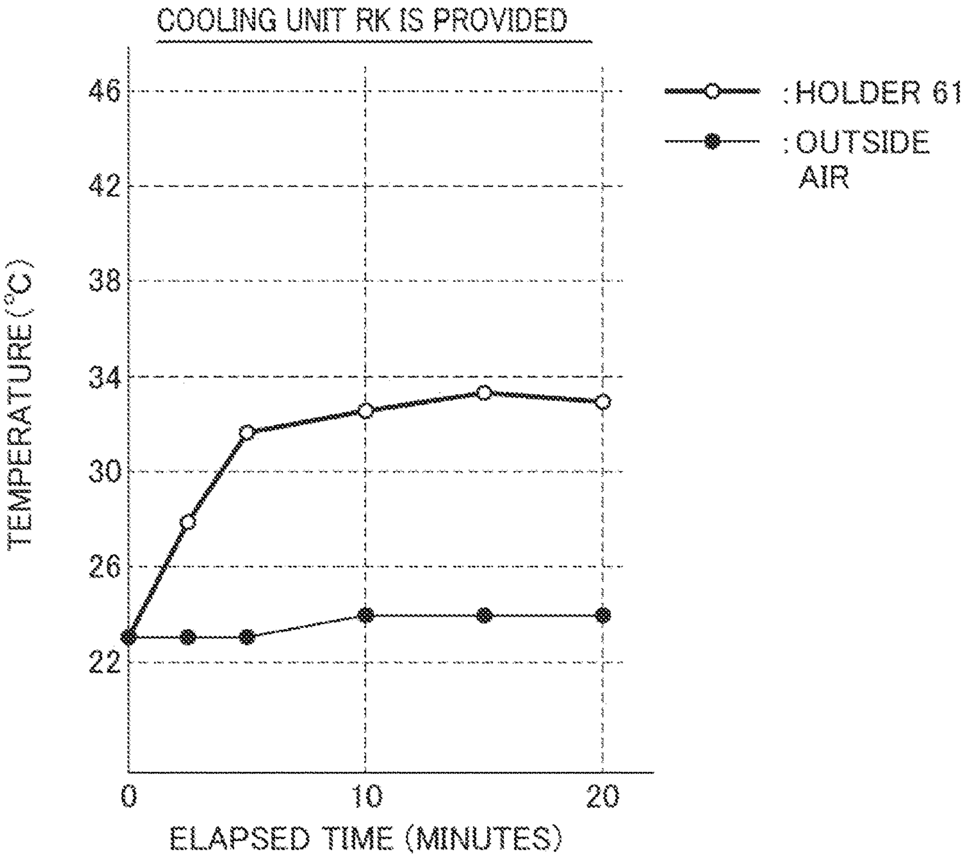
FIG. 8 is a graph illustrating changes over time in temperature, FIG. 8(*a*) illustrates temperature changes in the profile conversion device 5 of the example, and FIG. 8(*b*) illustrates temperature changes in a comparative example.
Figure 8:
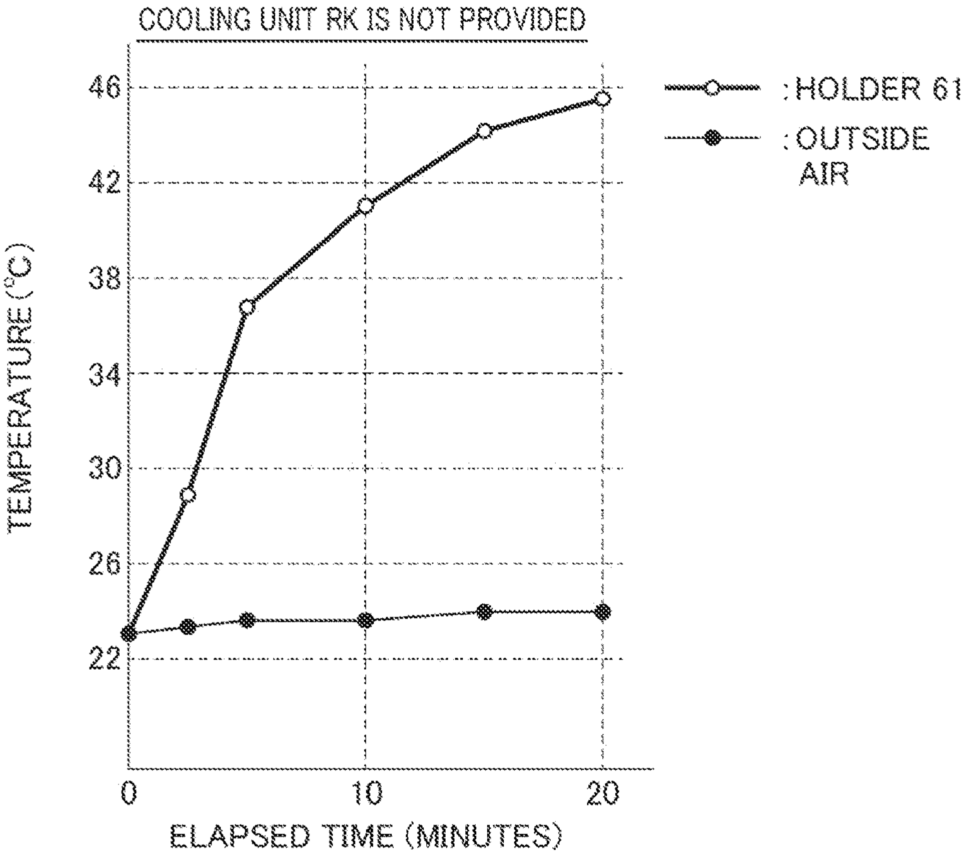

FIG. 8 is a graph illustrating changes over time in temperature, FIG. 8(*a*) illustrates temperature changes when using the profile conversion device 5 of the example, and FIG. 8(*b*) illustrates temperature changes in a comparative example. That is, FIG. 8(*a*) is a graph illustrating changes over time of increases in the temperature of the holder 61 and the outside air after the laser beam Ls is output from the laser oscillator 1 with the conversion element 71 as the entering position, in the profile conversion device 5 having the cooling unit RK. FIG. 8(*b*) is a graph illustrating changes over time of increases in the temperature of the holder 61 and the outside air after the laser beam Ls is output from the laser oscillator 1 with the conversion element 71 as the entering position, in a profile conversion device having the same configuration except that the profile conversion device does not have the cooling unit RK. The elapsed time is up to 20 minutes in each graph.

As illustrated in FIG. 8(*a*), regarding the outside air and the holder 61 at about 23° C. at the elapsed time of 0 minutes in the case where the cooling unit RK is provided, the holder 61 increases in temperature until the elapsed time of about 10 minutes, and is maintained at a saturation temperature of about 33° C. after the elapsed time of 10 minutes. As illustrated in FIG. 8(*b*), regarding the outside air and the holder 61 at about 23° C. at the elapsed time of 0 minutes in the case where the cooling unit RK is not provided, the holder 61 increases in temperature as the time elapses and reaches about 45° C. at the elapsed time of 20 minutes, but the holder 61 is not yet saturated and continues to increase in temperature.

As is clear in comparison between FIG. 8(*a*) and FIG. 8(*b*), in the case where the cooling unit RK is provided, the increase in temperature of the temperature increase members SB such as the conversion element 71 and the holder 61 is suppressed satisfactorily. As a result, the thermal lens effect of the conversion element 71 becomes less in the laser processing head 2, and the fluctuation of the focal position of the laser beam Ls can be suppressed to such a degree that there is no trouble in practical use, and thus no problem occurs. Further, the thermal expansion of the holder 61 and the shaft 62 becomes less, and the deviation of the optical axis center of the conversion element 71 can be suppressed to such a degree that there is no trouble in practical use, and thus no problem occurs. Therefore, the laser processing head 2 and the laser processing device 91 which are provided with the cooling unit RK can convert the beam profile of the laser beam Ls while hardly causing any processing defects.

In the vicinity of the tip end of the shaft 62 close to the conversion element 71, the cooling unit RK causes the low temperature water FL1 from before heat is transferred from the temperature increase members SB and which flows in from the inlet 631 to flow through the first flow path FR1 of the pipe 621 into the blind hole 62*a* in the vicinity of the tip end of the shaft 62 close to the conversion element 71 having the greatest increase in temperature. For this reason, there is a large temperature difference between the cooling unit RK and the shaft 62, which is the temperature increase member SB that first comes into contact with the water FL1. Therefore, there is a large amount of heat transferred from the shaft 62 to the water FL1, and thus the increase in temperature of the temperature increase members SB can be suppressed with high efficiency.

The flow direction of the water FL1 may be opposite. That is, the water FL1 is injected into the second flow path FR2 from the outlet 632 to cause the water FL1 to flow toward the holder 61. The water FL1 flowing through the second flow path FR2 passes through the connection flow path FR3, flows through the first flow path FR1, which is the inner space of the pipe 621, toward the base side of the shaft 62, and discharges from the inlet 631. In this flow direction, as the water FL1 flows toward the holder 61 through the second flow path FR2, the water FL1 increases in temperature due to the heat movement from the shaft 62, and when the water FL1 has reached the vicinity of the holder 61, the temperature increases from when the water FL1 is injected into the second flow path FR2. Therefore, it is effective to efficiently absorb the heat of the shaft 62 rather than the holder 61.

Since the mode of heat conduction changes according to the flow direction of the water FL1, it is possible to correct an imbalance in the cooling mode of the temperature increase members SB by appropriately reversing the flow direction.

As described above, it is preferable that, for example, in the cross-section perpendicular to the axis line CL2, the inner and outer diameters of the pipe 621 and the inner diameter of the blind hole 62*a* be set such that the cross-sectional area of the first flow path FR1 generally coincides with the cross-sectional area of the second flow path FR2. As a result, the flow rate and the flow velocity of the water FL1 flowing through the first flow path FR1 and the second flow path FR2 are generally constant, and stagnation is not likely to occur. This makes it possible to perform the heat transfer from the shaft 62 to the water FL1 with high efficiency, thereby satisfactorily suppressing the increase in temperature of the temperature increase members SB.

The example of the present invention is not limited to the above-described structure, and may be modified in a range not deviating from the scope of the present invention.

Modified Example 1

Figure 9:
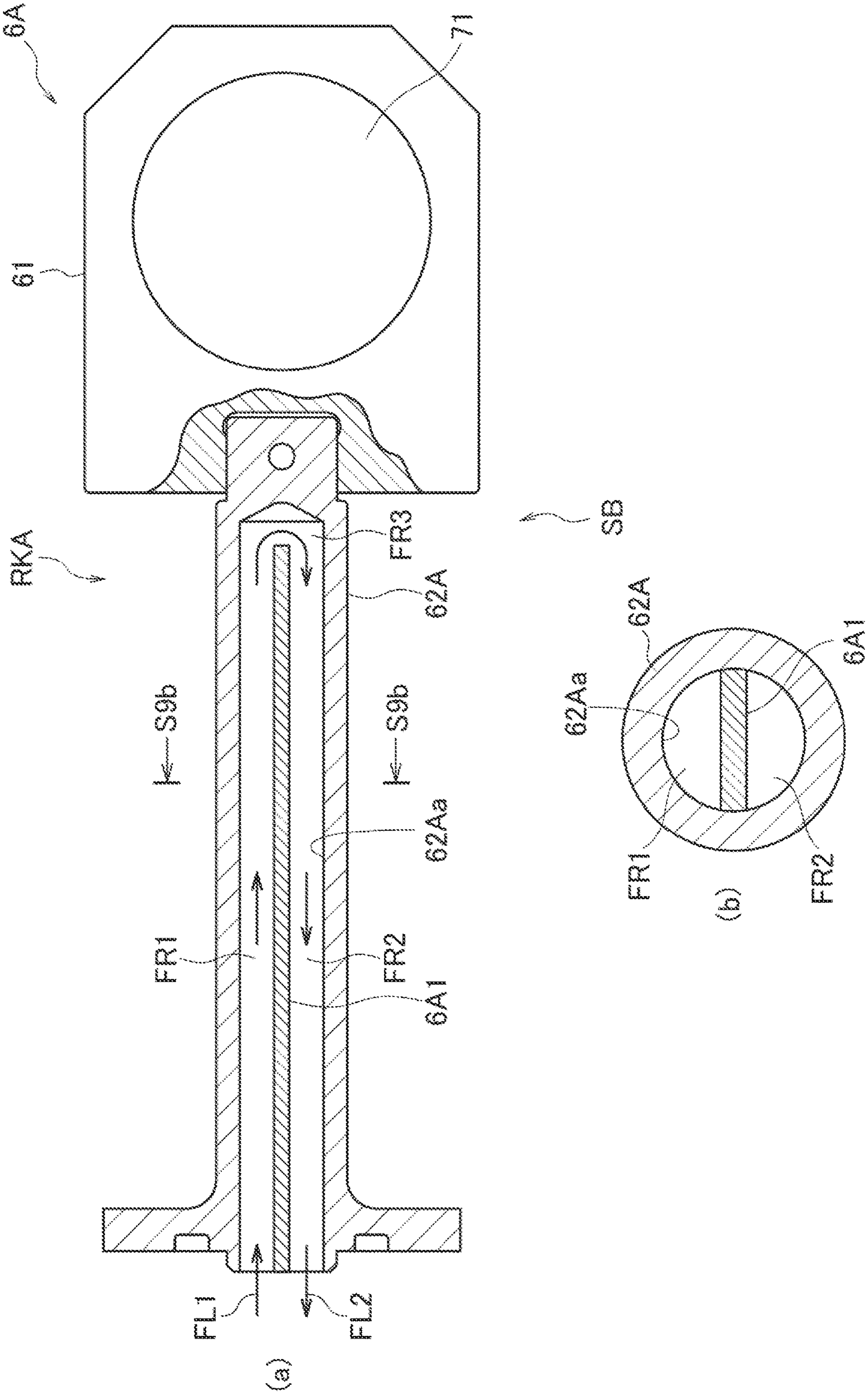
FIG. 9 is a diagram illustrating a cooling unit RKA which is a modified example 1 of the cooling unit RK, FIG. 9(*a*) is a partial cross-sectional view, and FIG. 9(*b*) is a cross-sectional view at the position S9*b*-S9*b* in FIG. 9(*a*).

As illustrated in FIG. 9, the conversion element movement unit 6 may be a conversion element movement unit 6A of a modified example 1 having a cooling unit RKA instead of the cooling unit RK. FIG. 9 is a diagram illustrating the cooling unit RKA which is the modified example 1 of the cooling unit RK, FIG. 9(*a*) is a partial cross-sectional view, and FIG. 9(*b*) is a cross-sectional view at the position S9*b*-S9*b* in FIG. 9(*a*).

The conversion element movement unit 6A includes a shaft 62A in place of the shaft 62, and the shaft 62A has a blind hole 62Aa and a partition wall 6A1. The partition wall 6A1 is a thin plate member arranged in the diameter direction so as to divide the space in the blind hole 62Aa except near the bottom of the blind hole 62Aa. The inner space of the blind hole 62Aa is divided into the first flow path FR1 and the second flow path FR2 by the partition wall 6A1, and the space near the bottom of the blind hole 62Aa where the partition wall 6A1 does not reach becomes the connecting flow path FR3 connecting the first flow path FR1 and the second flow path FR2.

In this structure, when the normal temperature water FL1 is injected into the first flow path FR1, the water FL1 changes in direction at the connecting flow path FR3, and flows out to the outside from the outlet 632 (not illustrated in FIG. 9) as the discharge water FL2 through the second flow path FR2. As a result, the heat is transferred from the inner surface of the blind hole 62Aa to increase the temperature of the water FL1 while the water FL1 flows through the first flow path FR1, the connecting flow path FR3, and the second flow path FR2, and the increase in temperature of the conversion element 71, the holder 61, and the shaft 62A, which are the temperature increase members SB, is suppressed instead.

The cooling unit RKA of the modified example 1 can easily form the first flow path FR1, the second flow path FR2, and the connecting flow path FR3 even when the shaft 62A is relatively thin and a pipe cannot be inserted into the blind hole 62Aa.

Modified Example 2

Figure 10:
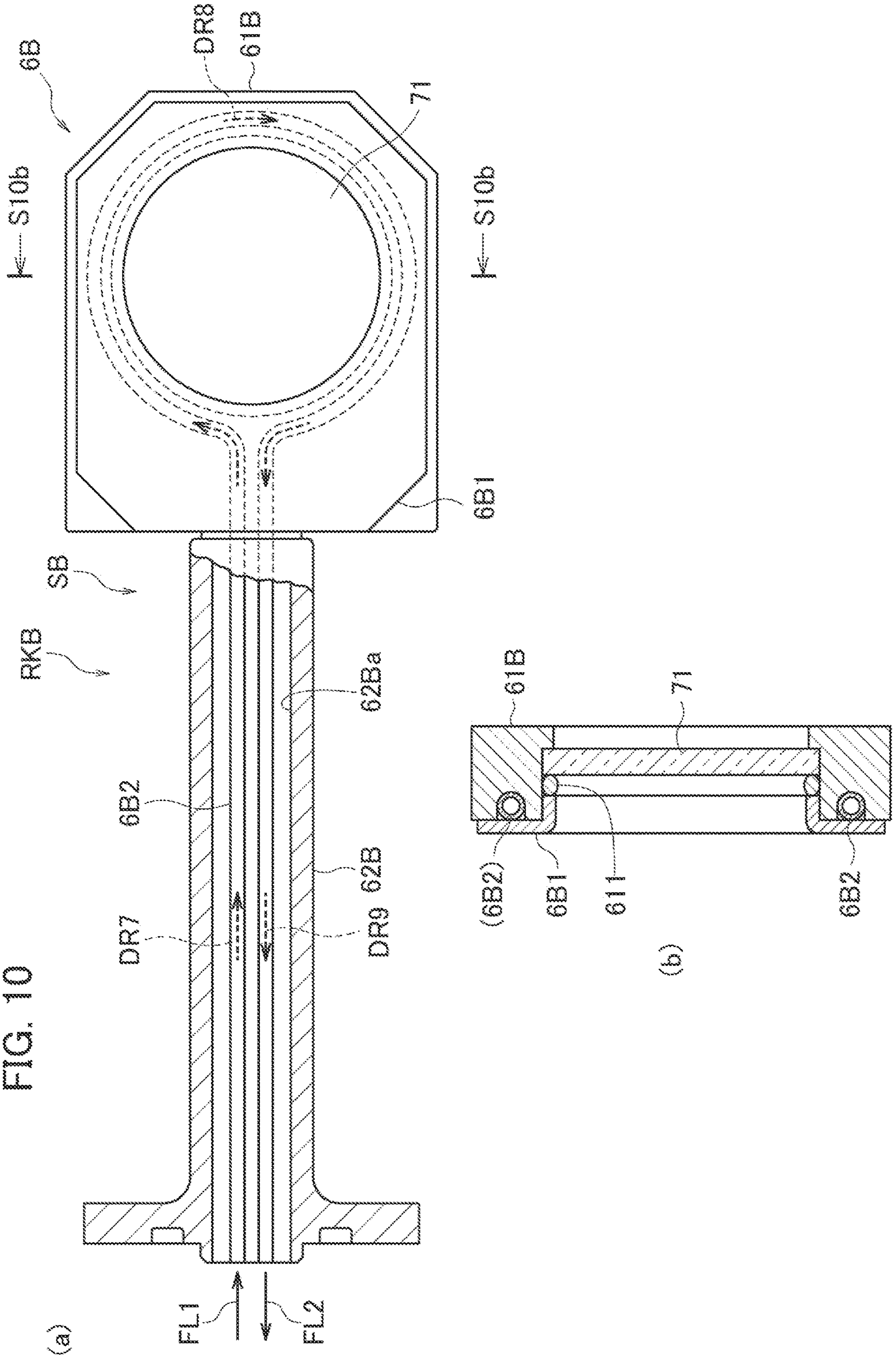
FIG. 10 is a diagram illustrating a cooling unit RKB which is a modified example 2 of the cooling unit RK, FIG. 10(*a*) is a partial cross-sectional view, and FIG. 10(*b*) is a cross-sectional view at the position S10*b*-S10*b* in FIG. 10(*a*).

As illustrated in FIG. 10, the conversion element movement unit 6 may be a conversion element movement unit 6B of a modified example 2 having a cooling unit RKB instead of the cooling unit RK. FIG. 10 is a diagram illustrating the cooling unit RKB which is the modified example 2 of the cooling unit RK, FIG. 10(*a*) is a partial cross-sectional view, and FIG. 10(*b*) is a cross-sectional view at the position S10*b*-S10*b* in FIG. 10(*a*).

The conversion element movement unit 6B includes a holder 61B and a shaft 62B in place of the holder 61 and the shaft 62, respectively, and includes a pipe-like conduit 6B2. The shaft 62B has a through-hole 62Ba which is not a blind hole. The conduit 6B2 is arranged in such a way as to pass through the through-hole 62Ba, surround the conversion element 71 of the holder 61B in an arc shape at the radially outward side, and pass through the through-hole 62Ba again. The conduit 6B2 inserted in the holder 61B is held in a predetermined position by the holding cover 6B1.

In this structure, the normal temperature water FL1 is injected into one conduit 6B2 in the through-hole 62Ba. The water FL1 flows through the pipe line 6B2 toward the holder 61B (see dashed arrow DR7), flows radially outward of the conversion element 71 of the holder 61B in an arc shape (see dashed arrow DR8), flows in the reverse direction through the through-hole 62Ba again (see dashed arrow DR9), and then flows out to the outside from the outlet 632 (not illustrated in FIG. 10) as the discharge water FL2. In this structure, the water FL1 increases in temperature due to heat transfer not only from the shaft 62B but also from the holder 61B. This suppresses the increase in temperature of the conversion element 71, the holder 61B, and the shaft 62B which are the temperature increase members SB.

In the vicinity of the conversion element 71 having the greatest increase in temperature, the cooling unit RKB of the modified example 2 transfers heat to the water FL1, and thus the increase in temperature of the temperature increase members SB can be suppressed satisfactorily.

Modified Example 3

Figure 11:
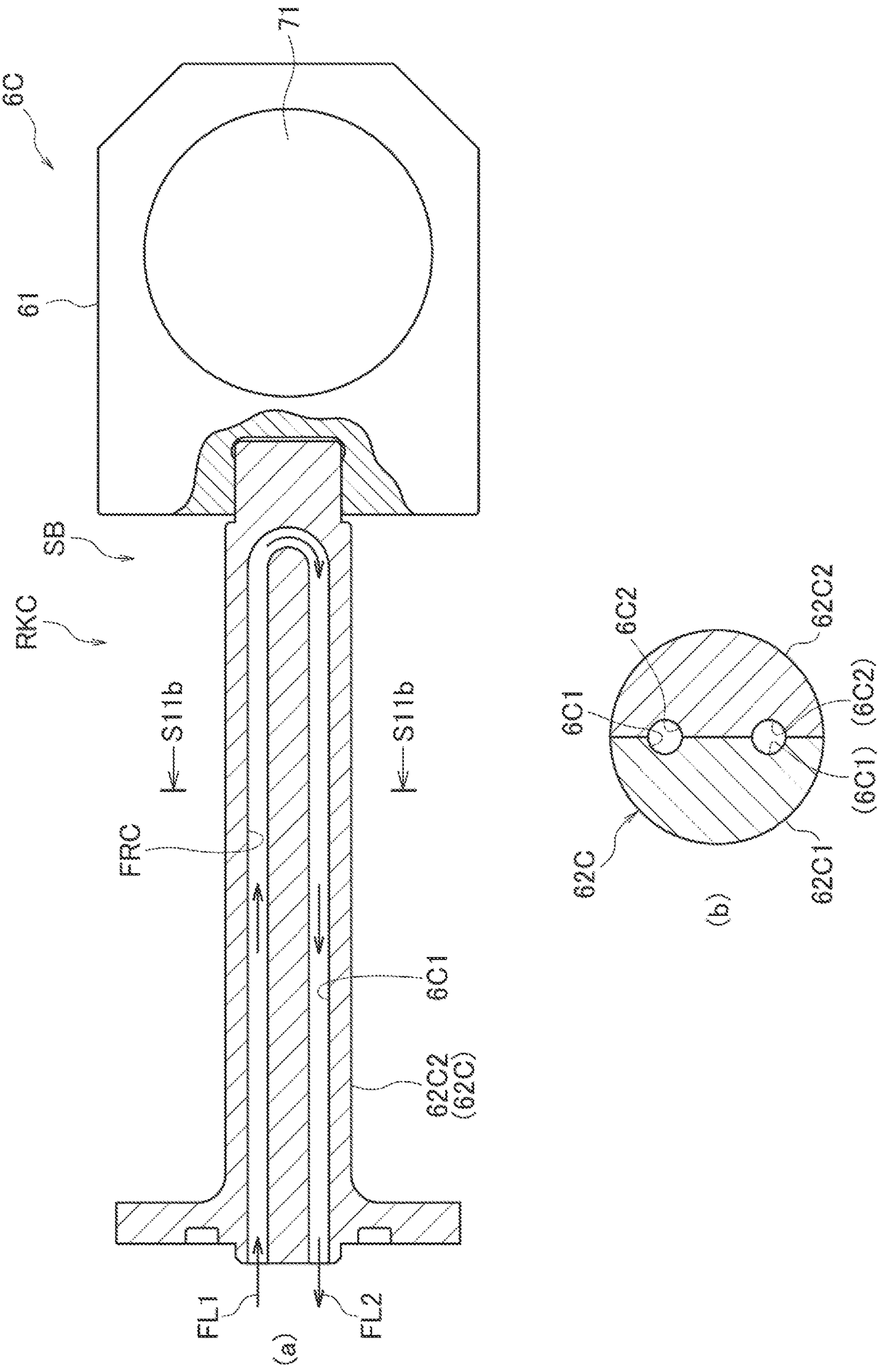
FIG. 11 is a diagram illustrating a cooling unit RKC which is a modified example 3 of the cooling unit RK, FIG. 11(*a*) is a partial cross-sectional view, and FIG. 11(*b*) is a cross-sectional view at the position S11*b*-S11*b* in FIG. 11(*a*).

As illustrated in FIG. 11, the conversion element movement unit 6 may be a conversion element movement unit 6C of a modified example 3 having a cooling unit RKC instead of the cooling unit RK. FIG. 11 is a diagram illustrating the cooling unit RKC which is the modified example 3 of the cooling unit RK, FIG. 11(*a*) is a partial cross-sectional view, and FIG. 11(*b*) is a cross-sectional view at the position S11*b*-S11*b* in FIG. 11(*a*).

The conversion element movement unit 6C includes a shaft 62C in place of the shaft 62. The shaft 62C is formed in a cylindrical shape by combining a semi-cylindrical half-shaft portion 62C1 and a half-shaft portion 62C2. As illustrated in FIG. 11(*a*) or FIG. 11(*b*), the half-shaft portions 62C1 and 62C2 have recesses 6C1 and 6C2, respectively, which are gouged such that the respective transverse sections have semi-circular shapes and become U-shaped in the longitudinal direction. In the shaft 62C in which the half-shaft part 62C1 and the half-shaft part 62C2 are combined, a flow path FRC is formed in which the recesses 6C1 and 6C2 face each other. The flow path FRC turns back on the holder 61 side. In addition, the flow path FRC has a circular transverse section and a U-shape in the longitudinal direction.

In this structure, when the normal temperature water FL1 is injected into the flow path FRC, the water FL1 turns back near the holder 61 and flows out to the outside from the outlet 632 (not illustrated in FIG. 11) as the discharge water FL2. As a result, the heat is transferred from the inner surfaces of the recess 6C1 and the recess 6C2 which are the inner surfaces of the flow path FRC to increase the temperature of the water FL1 while the water FL1 flows through the flow path FRC, and the increase in temperature of the conversion element 71, the holder 61, and the shaft 62C, which are the temperature increase members SB, is suppressed instead.

The conversion element movement unit 6C of the modified example 3 makes it possible to form the cooling unit RKC without using a pipe-like member, resulting in a relatively low cost.

Modified Example 4

Figure 12:
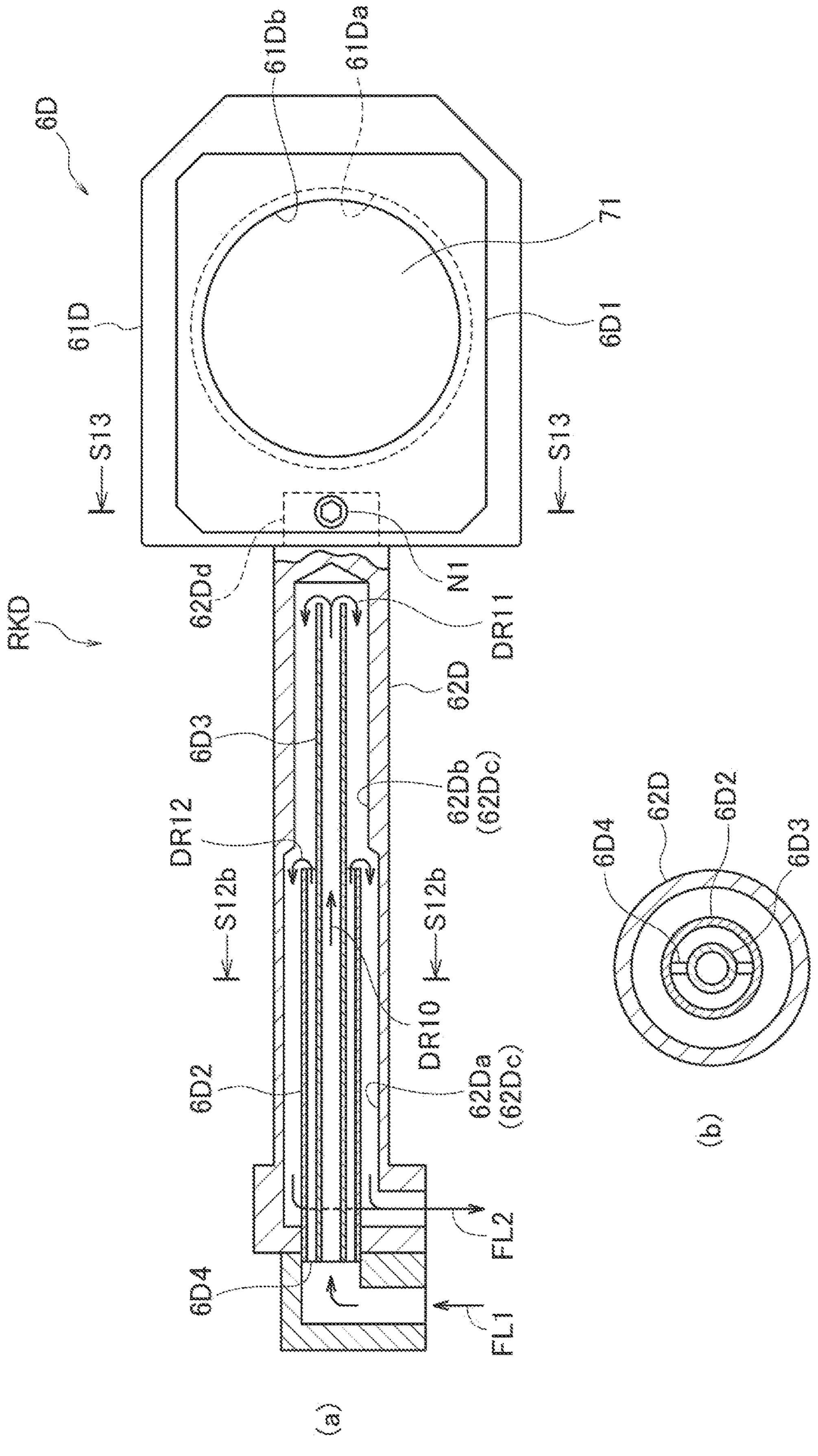
FIG. 12 is a diagram illustrating a cooling unit RKD which is a modified example 4 of the cooling unit RK, FIG. 12(*a*) is a partial cross-sectional view, and FIG. 12(*b*) is a cross-sectional view at the position S12*b*-S12*b* in FIG. 12(*a*).
Figure 13:
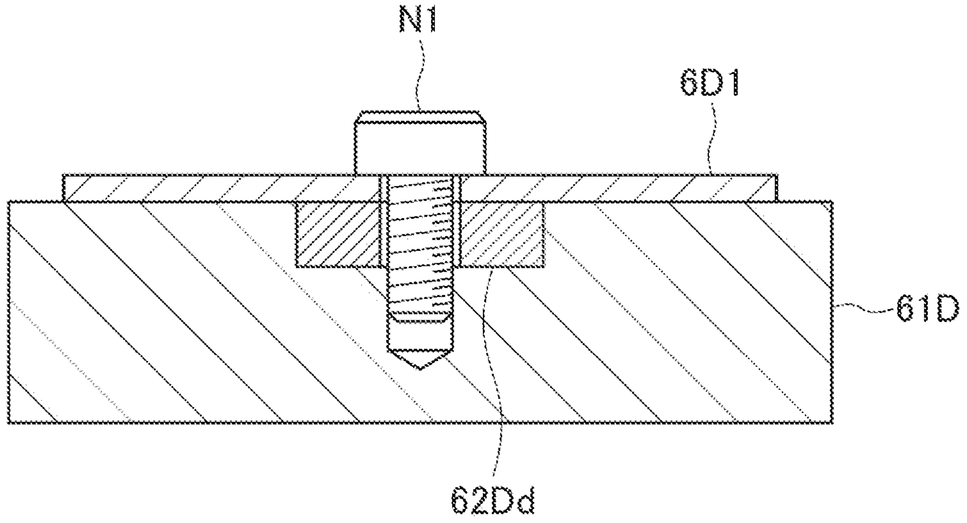
FIG. 13 is a cross-sectional view at the position S13-S13 in FIG. 12(*a*).

As illustrated in FIG. 12, the conversion element movement unit 6 may be a conversion element movement unit 6D of a modified example 4 having a cooling unit RKD instead of the cooling unit RK. FIG. 12 is a diagram illustrating the cooling unit RKD which is the modified example 4 of the cooling unit RK, FIG. 12(*a*) is a partial cross-sectional view, and FIG. 12(*b*) is a cross-sectional view at the position S12*b*-S12*b* in FIG. 12(*a*). FIG. 13 is a cross-sectional view at the position S13-S13 in FIG. 1(*a*)A.

The conversion element moving portion 6D includes a holder 61D, a presser plate 61D1, and a shaft 62D in place of the holder 61 and the shaft 62. The holder 61D has a housing portion 61Da, which is a circular recess, for housing the conversion element 71. The presser plate 61D1 is a thin plate having a circular opening portion 61Db which exposes an area excluding the peripheral edge of the conversion element 71. The presser plate 61D1 is formed of a thin metal plate having a higher thermal conductivity than the holder 61D. For example, the holder 61D is formed of aluminum, and the presser plate 61D1 is formed of a copper plate.

As illustrated in FIGS. 12 and 13, a flange 62Dd extends from the tip end of the shaft 62D. The presser plate 61D1 is fixed to the holder 61D by tightening the flange portion 62Dd with a bolt N1. According to this structure, most of the increased heat of the conversion element 71 in the conversion element moving portion 6D is transmitted to the shaft 62D via the presser plate 61D1. Thus, the increase in temperature of the conversion element 71 and the holder 61D is suppressed satisfactorily.

Meanwhile, the shaft 62D includes a blind hole 62Dc having a bottom on the holder 61D side, and a first pipe 6D2 and a second pipe 6D3 which are inserted inside the blind hole 62Dc. The second pipe 6D3 is longer than the first pipe 6D2. Further, the second pipe 6D3 is inserted into the hole of the first pipe 6D2, and has a tip end protruding from the first pipe 6D2 to the holder 61D side.

The blind hole 62Dc is a first hole 62Da having a first inner diameter at the outlet side, and a second hole 62Db having a second inner diameter smaller (thinner) than the first inner diameter at the rear side. The first pipe 6D2 is arranged in the first hole 62Da with a length shorter than the first hole 62Da. The second pipe 6D3 extends from the tip end of the first pipe 6D2 to the holder 61D side, and the extended portion of the second pipe 6D3 is arranged in the second hole 62Db with the position on the exit side from the bottom of the blind hole 62Dc as the tip end. The second pipe 6D3 is supported and connected to the first pipe 6D2 on the exit side by a connection piece 6D4.

In this structure, the water FL1 is injected into the first pipe 6D2 and the second pipe 6D3 from the tip end opposite to the holder 61D. The water FL1 injected into the second pipe 6D3 flows through the second pipe 6D3 (see arrow DR10) and flows out into the blind hole 62Dc at a position close to the bottom of the blind hole 62Dc (see arrow DR11), and thereafter the water FL1 flows in the reverse direction to become a return flow. The water FL1 injected into the first pipe 6D2 flows through the first pipe 6D2 and flows out into the blind hole 62Dc near the boundary between the first hole 62Da and the second hole 62Db of the blind hole 62Dc (see arrow DR12). The water FL1 flowing out from the first pipe 6D2 and the second pipe 6D3 into the blind hole 62Dc becomes a converged return flow and flows out to the outside from the outlet 632 (not illustrated in FIG. 12*d*) as the discharge water FL2.

As described above, the cooling unit RKD has a plurality of flow paths (two paths in this example) for supplying the water FL1 into the blind hole 62Dc, and the positions where the water FL1 flows out from each flow path into the blind hole 62Dc are different in the axial direction. For this reason, the heat can be transferred from the shaft 62D to the water FL1 as uniformly as possible with less deviation in the longitudinal direction. As a result, since the whole shaft 62D is cooled satisfactorily with the same temperature decreasing gradient, the increase in temperature of the conversion element 71 held by the holder 61D and the holder 61D can be suppressed satisfactorily.

The cooling units RKA to RKD described in the respective modified examples 1 to 4 make it possible to satisfactorily suppress the increase of temperature of the temperature increase members SB, and convert the beam profile of the laser beam Ls by means of the conversion element 71. For this reason, the thermal lens effect caused by the increase in temperature of the conversion element 71 becomes less, and the fluctuation of the focal position of the laser beam Ls can be suppressed to such a degree that there is no trouble in practical use, and thus no problem occurs. In addition, the thermal expansion of the holders 61A to 61D and the shafts 62A to 62D also becomes less, and the positional deviation of the optical axis of the conversion element 71 can be suppressed to such a degree that there is no trouble in practical use, and thus no problem occurs.

As described above, the laser processing head 2 and the laser processing device 91 provided with the cooling unit RK of the embodiment or the cooling units RKA to RKD of the modified examples 1 to 4 can convert the beam profile of the laser beam Ls, but do not cause processing defects.

Although an example using the refrigerant FL1 as water has been described above, the refrigerant FL1 is not limited to water. The refrigerant FL1 may be a gas instead of a fluid. When water is used as the refrigerant FL1, the present disclosure can be applied inexpensively and be easily handled. The example and the modified examples 1 to 4 described above may be freely combined as far as possible.

This application claims priority under Japanese Patent Application No. 2021-069778 filed with the Japan Patent Office on Apr. 16, 2021, the entire contents of which is incorporated herein by reference.

The invention claimed is:

1. A laser processing head comprising:

a conversion element configured to convert a beam profile of a laser beam that is supplied from outside and emitted from a nozzle;

a holder that holds the conversion element;

a shaft in which the holder is connected to a tip end of the shaft;

an actuator configured to move the shaft such that the conversion element enters a luminous flux of the laser beam and retracts therefrom;

a first flow path that is formed inside the shaft and enables a fluid that is a refrigerant to flow from a base side of the shaft toward a holder side of the shaft; and a second flow path that is formed inside the shaft and enables the fluid flowing through the first flow path to return from the holder side of the shaft to the base side.

2. The laser processing head according to claim 1, wherein the shaft includes a blind hole having a bottom portion on the holder side, and a pipe arranged inside the blind hole, a first space inside the pipe is one fluid path from among the first flow path and the second flow path, and a second space between an inner surface of the blind hole and an outer surface of the pipe is the other fluid path from among the first flow path and the second flow path.

3. A laser processing device comprising:

a laser oscillator configured to output a laser beam;

a laser processing head having a conversion element configured to convert a beam profile of the laser beam supplied from the laser oscillator; and a refrigerant supply device configured to supply a refrigerant to the laser processing head, wherein the laser processing head comprises:

a holder that holds the conversion element;

a shaft in which the holder is connected to a tip end of the shaft;

an actuator configured to move the shaft such that the conversion element enters a luminous flux of the laser beam and retracts therefrom;

a first flow path that is formed inside the shaft and enables the refrigerant that is supplied from the refrigerant supply device to flow from a base side of the shaft toward a holder side of the shaft; and a second flow path that is formed inside the shaft and enables the refrigerant flowing through the first flow path to return from the holder side of the shaft to the base side.

4. The laser processing device according to claim 3, wherein the shaft includes a blind hole having a bottom portion on the holder side, and a pipe arranged inside the blind hole, a first space inside the pipe is one fluid path from among the first flow path and the second flow path, and a second space between an inner surface of the blind hole and an outer surface of the pipe is the other fluid path from among the first flow path and the second flow path.

5. The laser processing device according to claim 4, wherein the first space is the first flow path, and the second space is the second flow path.

6. The laser processing device according to claim 3, wherein the refrigerant is water.

* * * * *